United States Patent
Launay

[15] 3,669,303
[45] June 13, 1972

[54] SEAL FOR THE COVER OF A VESSEL WITH A CIRCULAR OPENING

[72] Inventor: Pierre Launay, 108 Boulevard de la Reine, Versailles, France

[22] Filed: Jan. 13, 1971

[21] Appl. No.: 106,210

[30] Foreign Application Priority Data

Feb. 4, 1970    France..................................7003962

[52] U.S. Cl..........................................220/46 MS, 220/46 P
[51] Int. Cl............................................B65d 53/00
[58] Field of Search.............................220/46 MS, 46 R, 46 P

[56] References Cited

UNITED STATES PATENTS

| | | | |
|---|---|---|---|
| 2,352,038 | 6/1944 | Tolke | 220/46 MS |
| 2,797,017 | 6/1957 | Tangard | 220/46 MS |
| 3,127,050 | 3/1964 | McDaniels, Jr. | 220/46 MS X |
| 3,332,573 | 7/1967 | Romanos | 220/46 MS |
| 3,362,567 | 1/1968 | Rudock | 220/46 MS |

FOREIGN PATENTS OR APPLICATIONS 847,093    11/1951    Germany..........................220/46 MS Primary Examiner—M. Henson Wood, Jr.
Assistant Examiner—Thomas C. Culp, Jr.
Attorney—Cameron, Kerkam & Sutton

[57] ABSTRACT

A seal for location between a vessel and a closure, which seal is of omega cross-section, one base being fast with the closure and one base bearing through resilient material on the vessel.

8 Claims, 2 Drawing Figures

PATENTED JUN 13 1972
3,669,303
FIG: 1
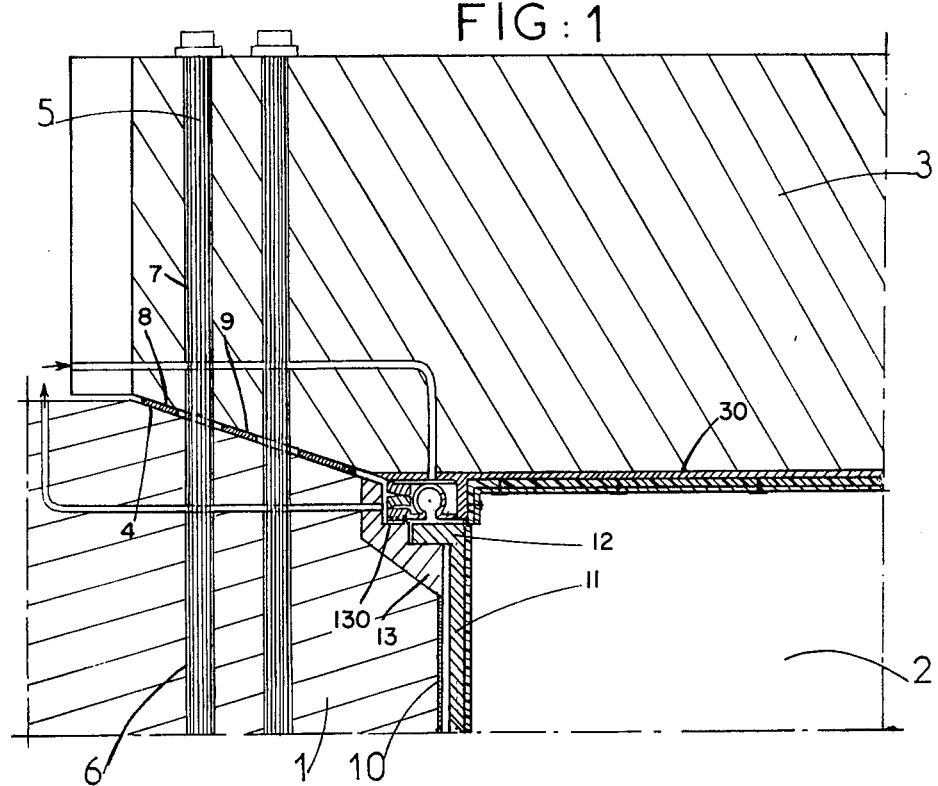
FIG: 2
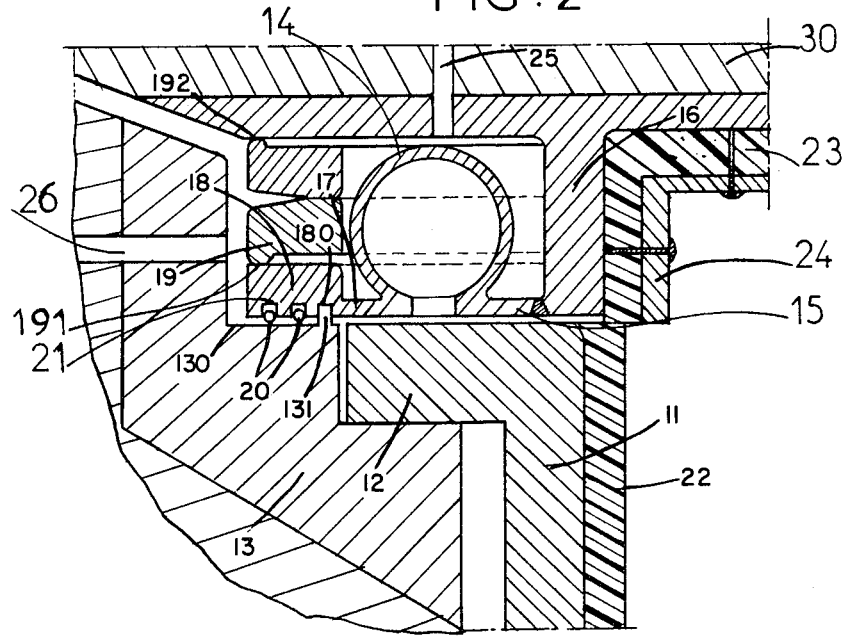

SEAL FOR THE COVER OF A VESSEL WITH A CIRCULAR OPENING

The invention relates to a seal for the cover of a vessel with a circular opening. More particularly, the invention applies to vessels subjected to high temperatures and pressures, for example nuclear reactor vessels.

It is an advantage to make nuclear reactor vessels from prestressed concrete, so that the same vessel or enclosure can both withstand the pressure built up in the reactor during operation and provide biological shielding.

In order to facilitate handling and possible replacement of the reactor core, it has been proposed that vessels should consist of a vessel (or box) which defines the reactor chamber and is closed by a detachable cover. Such vessels must withstand high pressures and are subjected to vibrations and to very large amplitude temperature variations, according to the reactor operating conditions. To provide some protection from the heat, the cover and the wall of the reactor chamber are covered with thermal insulation, which must be continuous at the join between the cover and the vessel. Also, the cover must be supported on a bearing surface on the vessel by way of a seal which allows for considerable lateral and vertical movement due to expansion. Moreover, since the cover is remote-controlled, the seal must not interfere with application of the cover and, when the cover has been taken off, there must not remain any component which interferes with removal of the entire core. Lastly, the seal must be easily cooled.

An object of the invention is to provide a seal which fulfils all these requirements.

The invention will now be described with reference to a particular embodiment, given by way of example and illustrated in the accompanying drawings.

FIG. 1 is a partial section in elevation of the upper part of a nuclear reactor vessel, illustrating the arrangement of the seal between the cover and the vessel; and FIG. 2 is a detail, in section, showing the seal embodying the invention.

The reactor vessel consists of a concrete vessel 1 defining a cylindrical chamber 2, which houses the reactor core and whose opening is closed with a cover 3, also of concrete. To facilitate removal of the cover, the latter is applied to a bearing surface 4 on the vessel in a known manner by prestressing reinforcements 5, passing freely through orifices 6 and 7 in the vessel and cover respectively. To facilitate centering of the cover, both the underside 8 of the latter and the bearing surface 4 on the vessel are conical. Resilient plates 9, for example of reinforced "Neoprene," may be inserted between the cover and the vessel.

The inside wall of the chamber and the underside of the cover are covered with metal sealing skins 10 and 30 respectively.

The reactor is mounted inside a metal skirt 11, suspended from the vessel 1 by way of a flange 12 integral with the skirt 11 and supported on a metal ring 13, which is fixed to the vessel and defines the opening of the chamber 2. This metal ring 13 also has a bearing surface 130 for the seal.

In accordance with the invention, the seal comprises an annular element 14 extending above the opening and having a cross-section in the form of an omega, of which one base 15 is welded to a barrel plate 16 abutting the sealing skin 30 and the other base 17 is extended by a flange 18.

This flange 18 is applied resiliently to the bearing surface 130 of the vessel by a spring 19 compressed between the flange and the cover. The coils of this spring bear on the flange 18 and sealing skin 30 along circular edges 191, 192.

Two O-ring seals 20, engaged in grooves 21 in the flange 18, are provided between the inside surface of the flange 18 and the bearing surface 130. A circular tenon 131 integral with the bearing ring 13 and projecting from the bearing surface 130 engages a corresponding groove in the flange 18.

As a result of the resilience of the seal, due to the omega-shaped cross-section of the annular element 14 and due to the spring 19, fluid-tightness is ensured whatever the vertical or lateral movements due to expansion or vibrations, and the seal remains perfectly centered by the tenon 131.

The skirt 11 and the inside surface of the cover are covered with thermal insulation 22 and 23 respectively. The insulation 23 is covered in turn by a box-like covering 24, to provide protection when the cover is removed. When the cover is in position, however, the extreme edges of the two insulation portions 22 and 23 are in contact with one another, to ensure that the thermal projection is continuous.

Since heating may still occur, however, the seal can be cooled by means of a coolant circuit, whose supply and discharge ducts 25, 26 lead into the chambers defined by the omega-shaped seal, cover 3 and bearing ring 13.

When the cover is taken off, the whole of the seal remains fixed to the cover. The O-ring seals 20 can easily be changed if required.

There is then no component obstructing removal of the skirt 11 containing the reactor core, if such removal is necessary.

When the cover is replaced, the conical shapes of the bearing surfaces 4 and 8 provide preliminary centering, accurate positioning of the seal being ensured by engagement of the tenon 131 in its groove 180.

The invention is not, of course, restricted to the details of the embodiment just described, which may be modified in certain ways without exceeding the scope of the invention.

In particular, a seal of this kind may be used for any pressurized vessel which has a detachable cover and is subject to considerable expansion or vibrations. Also, some other resilient element might be substituted for the spring 19, the omega-shaped cross-section of the element 14 itself providing some resilience.

Moreover, the centering tenon 131 might be made up of a plurality of circular segments or even be replaced by a plurality of studs capable of engaging in corresponding bores in the flange, or vice versa.

I claim:

1. A seal for the cover of a vessel with a circular opening, characterized in that it comprises an annular metal element whose cross-section is in the form of an omega, of which one base is fixed to the cover and the other base is extended by a flange capable of bearing, by way of resilient material, on a bearing surface formed on the vessel.

2. A seal as claimed in claim 1, characterized in that it comprises a flange-applying spring compressed between the flange and the cover.

3. A seal as claimed in claim 1, characterized in that the bearing surface of the flange contains at least one circular groove engaged by a resilient O-ring seal capable of being slightly flattened when the cover is put on the vessel.

4. A seal as claimed in claim 1, characterized in that the vessel has a circular tenon which projects from the bearing surface and can engage in a corresponding groove in the flange.

5. A seal as claimed in claim 1, characterized in that the vessel has a plurality of studs projecting from the bearing surface and capable of engaging in corresponding bores in the flange.

6. A seal as claimed in claim 1, characterized in that the chamber defined by the annular omega-shaped element and the cover is traversed by coolant flowing along a supply and discharge circuit provided in the cover and in the vessel.

7. A seal as claimed in claim 1, characterized in that the side wall of the vessel and that portion of the cover covering the opening are covered with respective thicknesses of thermal insulation, which come into contact with one another when the cover is put on the vessel.

8. A seal as claimed in claim 7, characterized in that the thermal insulation on the cover is concealed by a protective covering which reveals that end of the insulation coming into contact with the thermal insulation covering the inside wall of the vessel.

* * * * *

PO-1050
(5/69)

UNITED STATES PATENT OFFICE
CERTIFICATE OF CORRECTION

Patent No. 3,669,303          Dated June 13, 1972

Inventor(s) Pierre Launay

It is certified that error appears in the above-identified patent and that said Letters Patent are hereby corrected as shown below:

[73] Assignee: Compagnie Industrielle de Travaux ,
      Malesherbes, Seine. France --

Signed and sealed this 26th day of December 1972.

(SEAL)
Attest:

EDWARD M.FLETCHER,JR.
Attesting Officer

ROBERT GOTTSCHALK
Commissioner of Patents